United States Patent [19]

Nakanishi et al.

[11] Patent Number: 4,595,642
[45] Date of Patent: Jun. 17, 1986

[54] FUEL CELL COMPOSITE PLANT

[75] Inventors: Kenichi Nakanishi; Seiichi Tanabe, both of Tokyo; Jun Izumi, Hiroshima, all of Japan

[73] Assignee: Mitsubishi Jukogyo Kabushiki Kaisha, Toyko, Japan

[21] Appl. No.: 772,751

[22] Filed: Sep. 5, 1985

[30] Foreign Application Priority Data

Sep. 14, 1984 [JP] Japan .................. 59-193638

[51] Int. Cl.⁴ .................. H01M 8/06; C01B 23/00
[52] U.S. Cl. .................. 429/19; 423/262; 429/20
[58] Field of Search .................. 423/262; 429/19, 20

[56] References Cited

U.S. PATENT DOCUMENTS

| 2,909,410 | 10/1959 | Fedorko | 423/262 |
| 3,173,778 | 3/1965 | Gaumer | 423/262 |
| 3,493,339 | 2/1970 | Weir et al. | 423/262 |
| 3,615,850 | 10/1971 | Chludzinski et al. | 429/20 |
| 4,352,863 | 10/1982 | Maru | 429/20 |

Primary Examiner—Donald L. Walton
Attorney, Agent, or Firm—Toren, McGeady, Stanger, Golderg & Kiel

[57] ABSTRACT

A fuel cell composite plant characterized by comprising a fuel cell, a device for feeding a fuel gas to an anode of the fuel cell, a gas separator for feeding a high-purity oxygen gas containing argon to a cathode of the fuel cell, a combustor for burning unreacted gases from the anode and the cathode, and a cooling device for condensating and removing water from a burned gas in order to obtain an argon gas.

2 Claims, 3 Drawing Figures

FUEL CELL COMPOSITE PLANT

BACKGROUND OF THE INVENTION (1) Field of the Invention

The present invention relates to a fuel cell composite plant in which a fuel cell power generation plant and an argon gas manufacturing plant are combined.

(2) Description of the Prior Art

With regard to a conventional power generation plant comprising a fuel cell, for example, a phosphoric acid type fuel cell, its one example will first be described in reference to FIG. 3 of accompanying drawings.

In FIG. 3, a fuel cell body 1 comprises a fuel pole (anode) 1a, an air pole (cathode) 1b and an electrolyte (phosphoric acid) 1c interposed therebetween. A material gas and oxygen (or air) are fed from a material gas production system 2 and an oxygen gas holder 3, respectively, to a reforming device 4, where a reaction is then performed in order to form a hydrogen-rich gas having a hydrogen concentration of about 70%. The thus formed hydrogen-rich gas is afterward delivered to the above-mentioned fuel pole 1a through a valve 5.

On the other hand, the above-mentioned air pole 1b is supplied with air from which dusts have been removed by an air filter 6 and a pressure of which has been raised by means of an air compressor 7.

In the fuel cell body 1 thus constituted, an energy transformation efficiency of chemical energy into electric energy is about 50%, and the remaining portion of the chemical energy therein is transformed into thermal energy, which is afterward radiated in a cooling section 1d. Air which will function as a refrigerant is fed from the above-mentioned air compressor 7 to a cooling section 1d through a valve 8, and after cooled by means of a heat exchanger 9, the air is circulated by an air circulator 10.

A part of air from the air compressor 7 is also used for drive starting and for make-up.

The respective portions of the hydrogen-rich gas and air are consumed for the reaction in the fuel cell body 1, and unreacted gases discharged from the fuel pole 1a via a valve 11 and from the air pole 1b are employed as a fuel for a gas turbine 12 and air for combustion.

Eventually, these gases are discharged out of the system, after utilized to drive the gas turbine 12. When the plant is at rest, the valves 5 and 11 are operated to feed a nitrogen gas from a nitrogen gas holder 13 to the fuel pole 1a via a valve 14 and to thereby replace the hydrogen-rich gas therein with the fed nitrogen gas.

SUMMARY OF THE INVENTION

In the above-mentioned phosphoric acid type fuel cell, the substance which is fed to the air pole (cathode) 1b is air (in which a concentration of oxygen is 20%), and thus a utilization of the gas is low. Therefore, it is difficult to heighten a cell voltage, and used equipments cannot be compacted. Further, since the used air is only treated by its passsage through the air filter 6, its cleanness is low, which fact will lead to a shortened life span. If heightening the air cleanness is intended, a plant investment will increase, and additionally, a larger auxiliary machinery power will be required in the air system and the cooling system, so that operation costs will increase.

The present invention has now been achieved with the aim of eliminating the above-mentioned drawbacks, and it contemplates combining a fuel cell power generation plant with an argon gas manufacturing plant in order to mainly improve an air system of a conventional fuel cell power generation plant, thereby enhancing a performance of the fuel cell power generation plant and reducing costs of both the plants.

The fuel cell composite plant of the present invention is characterized by comprising a fuel cell, a device for feeding a fuel gas to an anode of the fuel cell, a gas separator for feeding a high-purity oxygen gas containing argon to a cathode of the fuel cell, a combustor for burning unreacted gases from the anode and the cathode, and a cooling device for condensating and removing water from a burned gas in order to obtain an argon gas.

According to the present invention, the oxygen gas containing argon fed from the gas separator is high in concetration and cleanness, and thus a high cell voltage can be obtained, which fact will enable used equipments to be compacted and will put off a life span of the cell. Further, since facilities and operational costs necessary for the gas separator can be used instead of an air system of a conventional fuel cell, and since a part of the gas separation operation can be carried out by utilizing facilities of the fuel cell, an electricity generation and the manufacture of an argon gas can be accomplished at low costs.

DETAILED DESCRIPTION OF THE INVENTION

Figure 1:
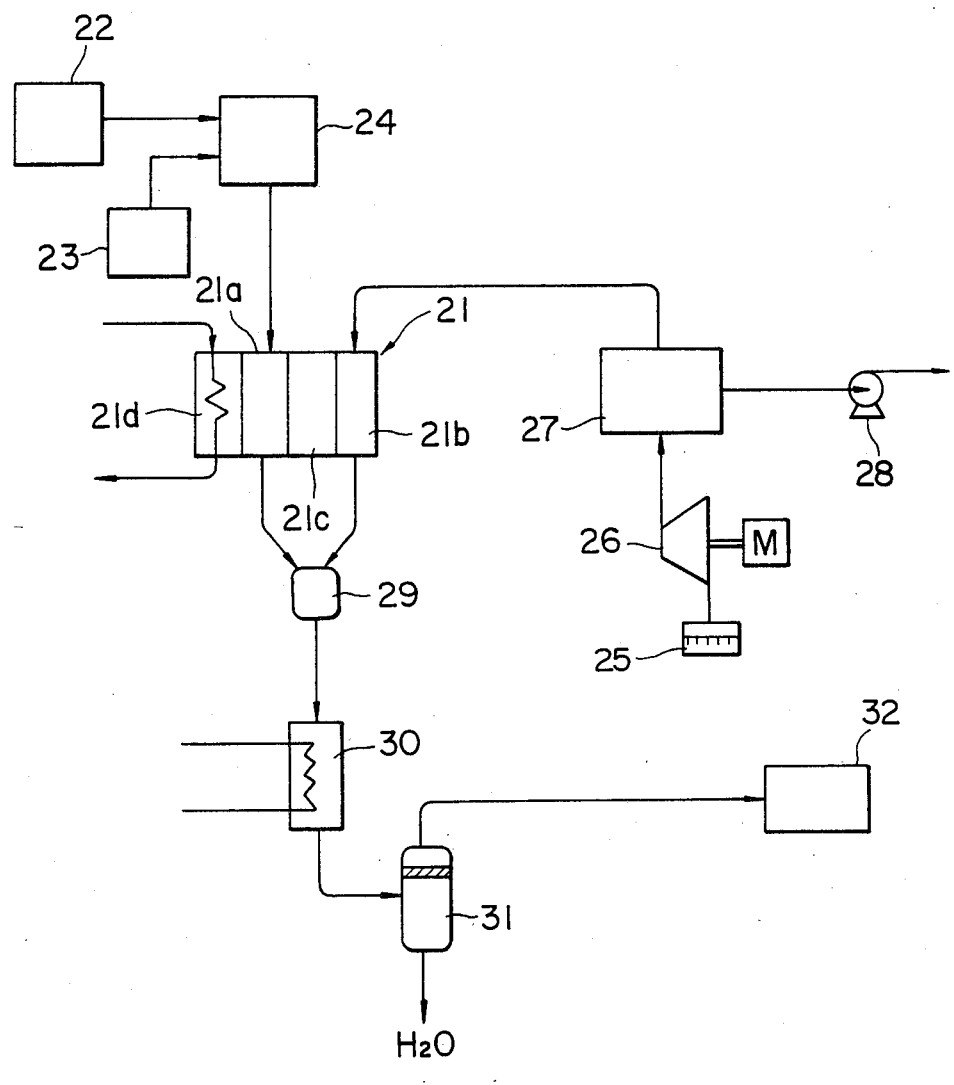
FIG. 1 is a flow sheet of a fuel cell composite plant in an embodiment of the present invention.

Referring now to FIG. 1, a fuel cell body 21 is composed of a fuel pole (anode) 21a, an air pole (cathode) 21b and an electrolyte (phosphoric acid) 21c interposed between these poles. Further, in a cooling section 21d of the fuel cell body 21, the radiation of heat is carried out. A material gas and oxygen (or air) are delivered from a material gas production system 22 and an oxygen gas holder 23, respectively, to a reforming device 24. They are reacted with each other therein to produce a hydrogen-rich gas, which is then fed to the fuel pole 21a. On the other hand, to the air pole 21b, there is fed a high-purity oxygen gas containing an argon gas from which dusts have been removed by an air filter 25 and a pressure of which has been raised by means of an air compressor 26 and which has been caused to pass through a pressure swing adsorption (hereinafter referred to as PSA) gas separator 27.

This PSA gas separator 27 is connected with a vacuum pump 28. The detailed explanation of the PSA gas separator 27 will be given in reference to FIG. 2 below.

The hydrogen-rich gas fed to the above-mentioned fuel pole 21a is reacted partially with the high-purity oxygen gas containing the argon gas fed to the air pole 21b, so that power generation occurs. Unreacted gases discharged from the fuel pole 21a and the air pole 21b through their outlets are suitably mixed and forwarded to the combustor 29, in which hydrogen and oxygen are all converted into water. In this case, the argon gas, since being inactive, is intactly discharged therefrom, and as a result, its concentration will become about 100%. In a cooling device 30, water condenses and is then delivered to an gas-liquid separator 31, in which water is removed therefrom, and the argon gas is forwarded to an argon gas holder 32.

Now, the above-mentioned PSA gas separator 27 will be described in referece to FIG. 2.

Figure 2:
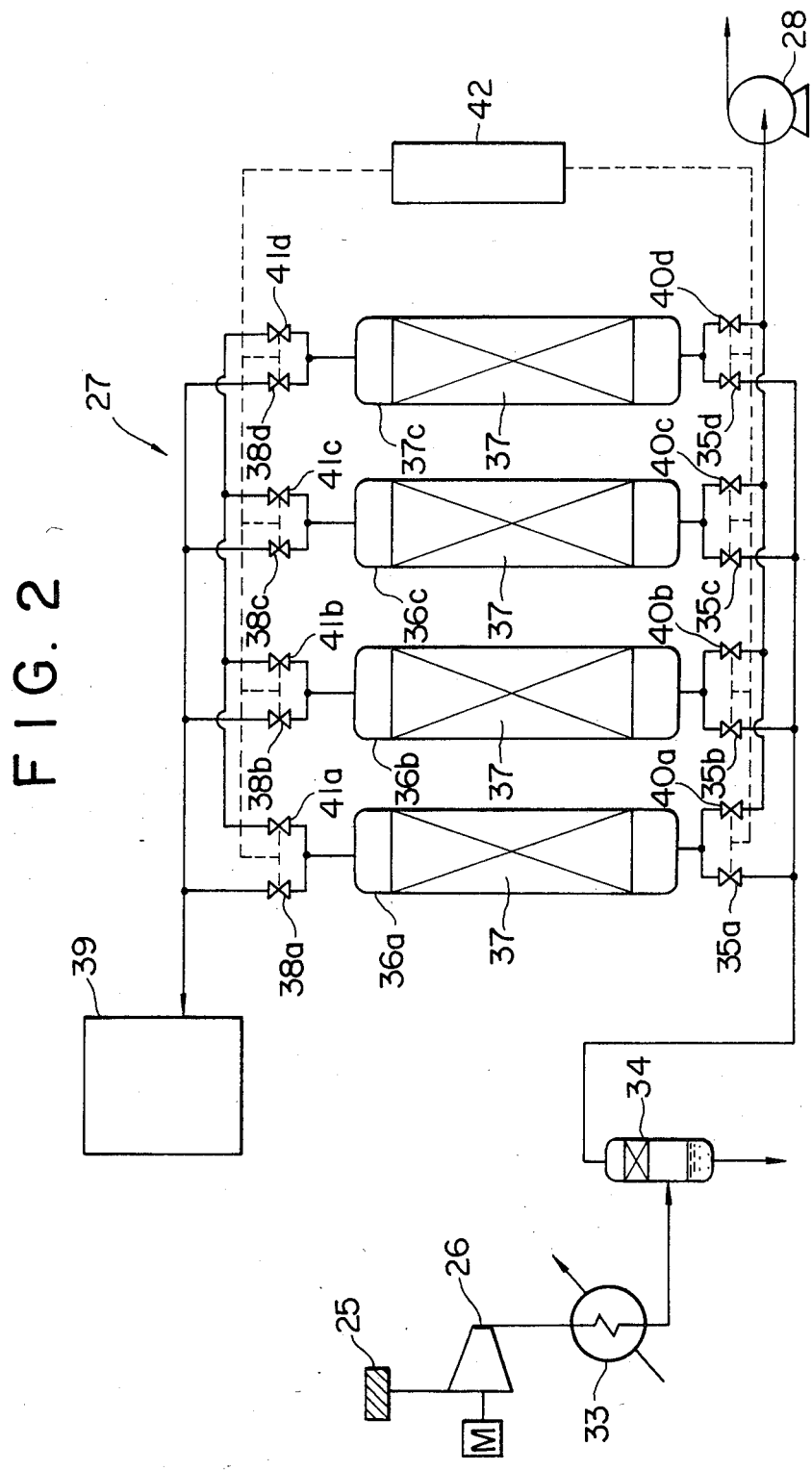
FIG. 2 is a flow sheet of a PSA type gas separator for use in the same plant.
Figure 3:
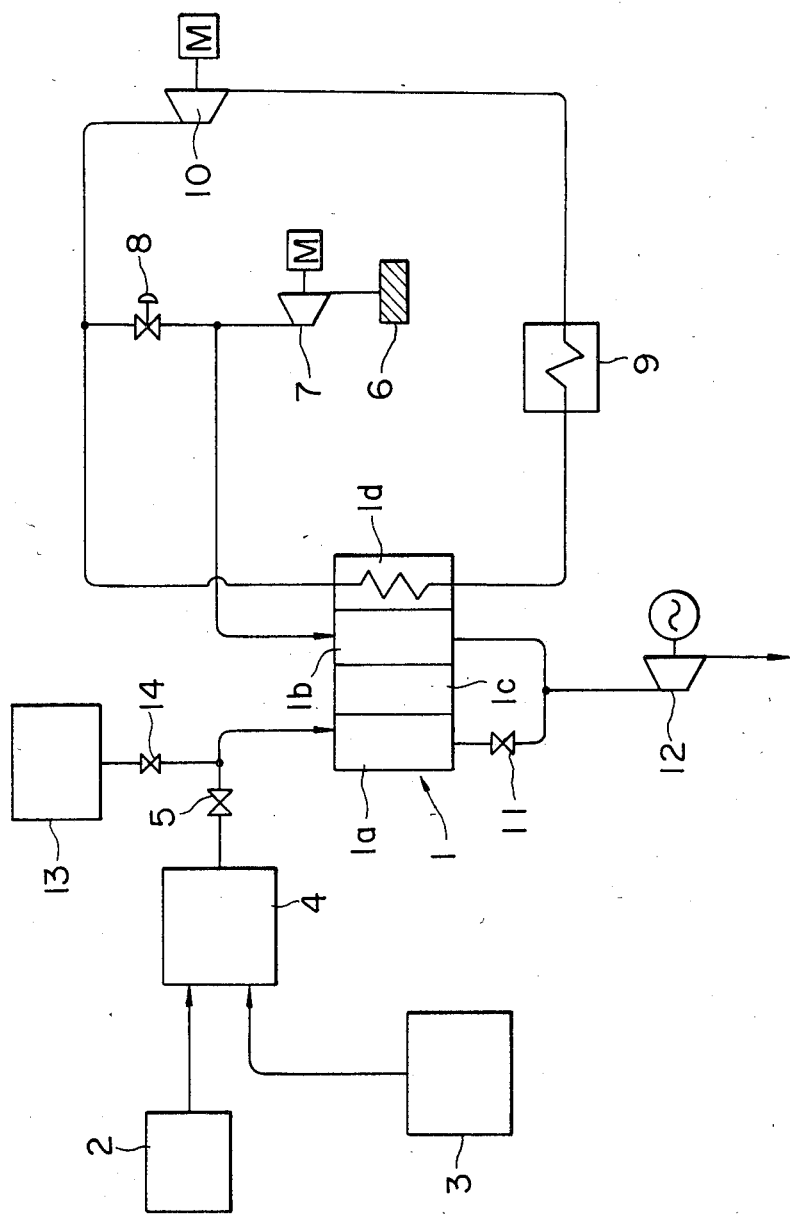
FIG. 3 is a flow sheet of a conventional fuel cell power generation plant.

In FIG. 2, the air from which dusts have been removed by causing it to pass through the air filter 25 is subjected to a pressure rise treatment at about 5 kg/cm$^2$ with the aid of the air compressor 26. Subsequently, compression heat is removed from the thus treated air in a cooling device 33, and water is further removed therefrom in a water separator 34. The air is then fed to adsorbing towers 36a, 36b, 36c, 36d through air inlet valves 35a, 36b, 36c, 36d.

These adsorbing towers 36a, 35b, 36c, 36d are charged with an adsorbent 37 comprising zeolite and the like named the so-called molecular sieves, and oxygen and argon alone pass through the adsorbent 37 and are then delivered to a product gas holder 39 via product gas feeding valves 38a, 38b, 38c, 38d. In this constitution, the above-mentioned adsorbing towers are provided, on the side of the air inlets, with outlet valves 40a, 40b, 40c, 40d for waste air, these outlet valves being connected to a vacuum pump 28.

Moreover, pressure equalizing valves 41a, 41b, 41c, 41d are provided on the adsorbing towers on the air outlet side thereof. To such an adsorbent 37 as the zeolite mentioned above, a fairly large amount of air is fed for its adsorbing ability, and thus it is necessary for the recovery of the adsorbing ability that the decrease in a pressure in the adsorbing towers and the adsorption of air are carried out, and the used air is then discharged from the system through the waste air outlet valves 40a, 40b, 40c, 40d and the vacuum pump 28. In order to accomplish the continuous supply of the product gas (the high-purity oxygen gas containing argon), it is required to periodically carry out the adsorption at a high pressure and a desorption at a low pressure, and at least two pairs of adsorbing towers are needed and in FIG. 2, four pairs of adsorbing towers are illustrated.

Furthermore, for the purpose of smoothly accomplishing the above-mentioned absorption and desorption processes, the air inlet valves 35a to 36d, the product gas-feeding valves 38a to 38d, the waste air outlet valves 40a to 40d and the pressure equalizing valves 41a to 41d may be controlled by signals from a control device 42.

In the aforesaid constitution, the fuel cell power generation plant and the argon gas manufacturing plant are organically combined.

According to the fuel cell composite plant described above, since the gas delivered to the air pole (cathode) 21 of the fuel cell body 21 is not usual air but the gas which has passed through the PSA gas separator 27 and an oxygen concentration of which is as high as about 95% (argon concentration=about 5%), a utilization of the gas can be hightened, whereby a high cell voltage can be obtained, performance improvement can be accomplished, used equipments can be compacted because of the reduction in the total gas volume, and a pressure loss can be decreased. Additionally, since the high-purity oxygen gas containing argon which has passed through the air filter 25 and the adsorbent 37 is employed in the present invention, its cleanness can be heightened, with the result that a life span of the cell can be prolonged.

Further, in the fuel cell power generation plant of the present invention, the gas to be fed to the air pole (cathode) 21b can be obtained from equipments necessary for the argon gas manufacture plant and on the other hand, a part of the gas separating operation can be carried out by equipments (the combustor 29 and the like) for the fuel cell power generation plant. Therefore, power generation costs and argon manufacture costs can be more reduced than in the respective single separate plants.

The cooling section 21d in the fuel cell body 21 of the present invention may have any type of water cooling, air cooling, organic medium and the like.

Examples of the material gases for the fuel cell used in the present invention include hydrocarbon gases (methane and the like), natural gases, methanol, off-gases from iron mills (a blast furnace gas, a coke oven gas, a converter gas and an electric furnace gas) and the like. If necessary, each gas just mentioned may be modified and be subjected to a gas separation and purification treatment, and may be then fed to the fuel pole (anode) as the hydrogen-rich gas.

The gas to be fed to the fuel pole may contain appreciable amounts of $CO_2$ and CO in addition to hydrogen. In the case that such a fuel gas is used, the PSA gas separator may also be disposed on the downstream side of the gas-liquid separator shown FIG. 1. That is to say, when such a fuel gas as is mentioned above is employed, the unreacted gases from the fuel pole (anode) 21a and the air pole (cathode) 21b can be reacted with each other to convert hydrogen and oxygen into the total amount of water, and they are then caused to pass through the cooling device 30 and the gas-liquid separator 31, so that the gas containing argon, $CO_2$ and CO can be discharged therefrom. Afterward, the gas may be caused to pass through the PSA gas separator not shown in order to remove $CO_2$ and CO, and the high-purity argon gas may be then delivered to the argon gas holder 32.

The description given above has been made about the case where the phosphoric acid type fuel cell is employed. However, it should be understood that the present invention is not limited to such a use but can also be applied to alkaline type fuel cells and the like.

As is apparent from the above, the fuel cell composite plant of the present invention permits accomplishing the performance improvement of the fuel cell power plant, the extension of its life and the decrease in costs of power generation and argon gas manufacture.

What is claimed is:

1. A fuel cell composite plant characterized by comprising a fuel cell, a device for feeding a fuel gas to an anode of said fuel cell, a gas separator for feeding a high-purity oxygen gas containing argon to a cathode of said fuel cell, a combustor for burning unreacted gases from said anode and said cathode, and a cooling device for condensating and removing water from a burned gas in order to obtain an argon gas.

2. A fuel cell composite plant according to claim 1 wherein said gas separator comprises a pressure swing adsorbing type gas separator.

* * * * *